(12) United States Patent
Suzaki

(10) Patent No.: US 12,344,311 B2
(45) Date of Patent: *Jul. 1, 2025

(54) VEHICLE BASE STRUCTURE

(71) Applicant: TOYOTA JIDOSHA KABUSHIKI KAISHA, Aichi-ken (JP)

(72) Inventor: Takahiro Suzaki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 82 days.

This patent is subject to a terminal disclaimer.

(21) Appl. No.: 18/328,773

(22) Filed: Jun. 5, 2023

(65) Prior Publication Data

US 2023/0311999 A1     Oct. 5, 2023

Related U.S. Application Data

(63) Continuation of application No. 17/184,591, filed on Feb. 25, 2021, now Pat. No. 11,807,304.

(30) Foreign Application Priority Data

Mar. 3, 2020   (JP) .................................. 2020-036122

(51) Int. Cl.
*B60K 1/04*         (2019.01)
*B60L 3/00*         (2019.01)
(Continued)

(52) U.S. Cl.
CPC .............. *B62D 21/157* (2013.01); *B60K 1/04* (2013.01); *B60L 3/0007* (2013.01);
(Continued)

(58) Field of Classification Search
CPC .... B62D 21/157; B62D 25/2009; B60K 1/04; B60K 2001/0405; B60L 3/007
(Continued)

(56) References Cited

U.S. PATENT DOCUMENTS 5,718,048 A   2/1998   Horton et al.
6,003,935 A   12/1999  Kalazny
(Continued)

FOREIGN PATENT DOCUMENTS

DE    102016013633 A1   5/2018
EP         1741619 A1   1/2007
(Continued)

OTHER PUBLICATIONS

Notice of Allowance in U.S. Appl. No. 17/184,591, dated Sep. 13, 2023, 11pp.

(Continued)

*Primary Examiner* — Hau V Phan
(74) *Attorney, Agent, or Firm* — HAUPTMAN HAM, LLP

(57) ABSTRACT

A vehicle base structure includes first and second structural members extending along a vehicle front-rear direction and disposed respectively at first and second sides of a vehicle base in a vehicle width direction, a battery unit disposed between the first and second structural members, and a bracket including a first wall portion fixed to a lower surface of one of the first and second structural members, a second wall portion extending inward in the vehicle width direction from an inner end portion of the first wall portion and inclined downward in a vehicle-height direction from the inner end portion of the first wall portion, and a third wall portion extending inward in the vehicle width direction from an inner end portion of the second wall portion inward in the vehicle width direction and being fixed to a lower surface of a battery case.

20 Claims, 4 Drawing Sheets

(51) Int. Cl.
  *B62D 21/15* (2006.01)
  *B62D 25/20* (2006.01)
(52) U.S. Cl.
  CPC .. *B62D 25/2009* (2013.01); *B60K 2001/0405* (2013.01); *B60Y 2306/01* (2013.01)
(58) Field of Classification Search
  USPC ........................................................ 180/232
  See application file for complete search history.

(56) References Cited

U.S. PATENT DOCUMENTS

| | | | |
|---|---|---|---|
| 6,428,046 B1 | 8/2002 | Kocer et al. | |
| 7,121,586 B2 | 10/2006 | Mcnally | |
| 7,416,043 B2 | 8/2008 | Pipkorn et al. | |
| 10,780,767 B2* | 9/2020 | Rawlinson | B62D 25/2036 |
| 11,807,304 B2* | 11/2023 | Suzaki | B60K 1/04 |
| 2009/0058065 A1* | 3/2009 | Park | B62D 21/02 |
| | | | 280/830 |
| 2013/0026786 A1* | 1/2013 | Saeki | B60K 1/04 |
| | | | 296/187.08 |
| 2013/0229030 A1* | 9/2013 | Yamaguchi | B62D 25/20 |
| | | | 296/193.07 |
| 2014/0291046 A1* | 10/2014 | Araki | B62D 25/20 |
| | | | 180/68.5 |
| 2015/0174996 A1* | 6/2015 | Ikeda | H01M 8/2465 |
| | | | 180/68.5 |
| 2016/0114667 A1* | 4/2016 | Ikeda | H01M 50/24 |
| | | | 180/68.5 |
| 2016/0257187 A1 | 9/2016 | Nakajima | |
| 2016/0288636 A1* | 10/2016 | Kamimura | B62D 25/2036 |
| 2017/0305251 A1 | 10/2017 | Hara et al. | |
| 2018/0237075 A1 | 8/2018 | Kawabe et al. | |
| 2018/0272852 A1* | 9/2018 | Ajisaka | B62D 21/152 |
| 2019/0047628 A1* | 2/2019 | Kawase | B62D 25/2036 |
| 2019/0126983 A1 | 5/2019 | Okura et al. | |
| 2019/0181398 A1 | 6/2019 | Shimada | |
| 2019/0248423 A1 | 8/2019 | Kato et al. | |
| 2019/0359048 A1* | 11/2019 | Tsuyuzaki | B60K 1/04 |
| 2021/0276621 A1 | 9/2021 | Suzaki | |

FOREIGN PATENT DOCUMENTS

| | | |
|---|---|---|
| EP | 2755839 B1 | 3/2017 |
| EP | 2910394 B1 | 12/2018 |
| JP | 2009-057035 A | 3/2009 |
| JP | 2014-080116 A | 5/2014 |
| JP | 2017-193289 A | 10/2017 |
| JP | 2019-137354 A | 8/2019 |
| JP | 2019-156003 A | 9/2019 |
| JP | 2019-167032 A | 10/2019 |

OTHER PUBLICATIONS

Unpublished U.S. Appl. No. 17/086,457, filed Nov. 2, 2020, 28pp.
Corrected Notice of Allowability in U.S. Appl. No. 17/184,591, mailed Aug. 2, 2023, 6pp.
Corrected Notice of Allowability in U.S. Appl. No. 17/184,591, mailed Jun. 15, 2023, 6pp.
Notice of Allowance in U.S. Appl. No. 17/184,591, mailed Mar. 6, 2023, 7pp.
Office Action in U.S. Appl. No. 17/184,591, mailed Nov. 22, 2022, 13pp.
U.S. Appl. No. 17/184,591, filed Feb. 25, 2021, 26pp.

* cited by examiner

VEHICLE BASE STRUCTURE

CROSS-REFERENCE TO RELATED APPLICATION

This application is a continuation of U.S. patent application Ser. No. 17/184,591, filed Feb. 25, 2021, which claims priority to Japanese Patent Application No. 2020-036122 filed on Mar. 3, 2020, the disclosures of which applications are hereby incorporated by reference herein in their entirety.

BACKGROUND

1. Technical Field

The disclosure relates to a vehicle base structure.

2. Description of Related Art

There is disclosed technology in which a battery unit is installed in a vehicle base (e.g., Japanese Unexamined Patent Application Publication No. 2009-57035 (JP 2009-57035 A)). In such technology, the battery unit is disposed using limited space between a pair of right and left structural members, for example.

SUMMARY

Now, in the above technology, in a broadside collision, inertia force acts on the battery unit toward the collision side, and accordingly the battery unit moves. However, the above related art has room for improvement with regard to a point of lengthening the movement stroke (stroke over which movement is enabled) of the battery unit in a broadside collision, in the limited space of the vehicle base.

The disclosure provides a vehicle base structure in which the movement stroke of the battery unit in a broadside collision can be lengthened.

A vehicle base structure according to an aspect of the disclosure includes first and second structural members extending along a vehicle front-rear direction, the first and second structural members being disposed respectively at first and second sides of a vehicle base in a vehicle width direction, a battery unit disposed between the first and second structural members, the battery unit including a battery case and a battery accommodated in the battery case, and a bracket including a first wall portion fixed to a lower surface of one of the first and second structural members, a second wall portion extending inward in the vehicle width direction from an inner end portion of the first wall portion such that the second wall portion is inclined downward in a vehicle-height direction from the inner end portion of the first wall portion, the inner end portion of the first wall portion being an end portion at an inward side of the first wall portion in the vehicle width direction, and a third wall portion extending inward in the vehicle width direction from an inner end portion of the second wall portion, the third wall portion being fixed to a lower surface of the battery case, and the inner end portion of the second wall portion being an end portion at an inward side of the second wall portion in the vehicle width direction.

According to the above aspect, inertia force acts on the battery unit toward the collision side in a broadside collision. As the battery unit is displaced toward the structural member on the collision side, the bracket deforms with a connecting portion of the first wall portion and the second wall portion and a connecting portion of the second wall portion and the third wall portion as starting points. At this time, inertia force toward the outward side in the vehicle width direction acts upon the connecting portion of the second wall portion and the third wall portion, and moment centered on the connecting portion of the first wall portion and the second wall portion is generated. Now, the second wall portion extends inward in the vehicle width direction from an inner end portion of the first wall portion such that the second wall portion is inclined downward in a vehicle-height direction from the inner end portion of the first wall portion, and accordingly, when the moment is generated, a load acts on the battery unit, causing the battery unit to be displaced from the installation position toward the outward side in the vehicle width direction and the vehicle downward side. Accordingly, the battery unit is guided from the installation position toward the outward side in the vehicle width direction and the vehicle downward side. Thus, the movement stroke of the battery unit in a broadside collision is longer as compared to when the battery unit moves horizontally toward the collision side in a broadside collision.

In the above aspect, the bracket may be fixed to the lower surface of the battery case, at an inner part of the third wall portion, the inner part being at an inward side of the third wall portion in the vehicle width direction. The third wall portion may be configured to, when a load acts to move the battery unit from an installation position of the battery unit outward in the vehicle width direction and downward in the vehicle-height direction, exhibit bending deformation under the load.

In the above aspect, a time when the load acts to move the battery unit, may be a time when a collision load is input to the first and second structural members from outward in the vehicle width direction and inertia force to outward in the vehicle width direction acts on a connecting portion of the second wall portion and the third wall portion so that moment centered on a connecting portion of the first wall portion and the second wall portion is generated and the load acts to move the battery unit.

According to the above configuration, when a collision load is input to the structural member from the outward side in the vehicle width direction and inertia force to the outward side in the vehicle width direction acts on the connecting portion of the second wall portion and the third wall portion of the bracket so that moment centered on the connecting portion of the first wall portion and the second wall portion of the bracket is generated, the load acts to cause the battery unit to move from the installation position thereof toward the outward side in the vehicle width direction and also toward the vehicle downward side, and the third wall portion of the bracket exhibits bending deformation under the load from the battery unit side. When the battery unit moves while causing bending deformation of the third wall portion of the bracket, a pivoting radius around the connecting portion of the first wall portion and the second wall portion serving as the center of pivoting can be made to be longer in comparison with when there is no bending deformation of the third wall portion (in other words, in comparison with when the length of the second wall portion as viewed in the vehicle front-rear direction is the pivoting radius). As a result, the movement stroke of the battery unit can be made to be longer.

In the above aspect, the first and second structural members each may have a closed cross-section structure that extends along the vehicle front-rear direction. The first and second structural members each may include a first lower-wall portion that makes up a lower wall of a corresponding one of the structural members, the lower wall being at an outward side of the corresponding one of the first and second structural members in the vehicle width direction, a second lower-wall portion disposed at a position that is inward of the first lower-wall portion in the vehicle width direction and that is above the first lower-wall portion in the vehicle-height direction, the second lower-wall portion having a lower surface to which the first wall portion is fixed, and a stepped portion that connects an inner end portion of the first lower-wall portion and an outer end portion of the second lower-wall portion to each other along the vehicle-height direction, the inner end portion of the first lower-wall portion being at an inward side of the first lower-wall portion in the vehicle width direction, and the outer end portion of the second lower-wall portion being at an outward side of the second lower-wall portion in the vehicle width direction. Inside each of the first and second structural members, a bulkhead may be provided, the bulkhead being interposed between the stepped portion and a side-wall portion of a corresponding one of the first and second structural members, the side-wall portion being at the outward side of the corresponding one of the first and second structural members in the vehicle width direction.

According to the above configuration, the second lower-wall portion is set to a position that is inward of the first lower-wall portion in the vehicle width direction and that is above the first lower-wall portion in the vehicle-height direction of the first lower-wall portion, and the first wall portion of the bracket is fixed to the lower surface thereof. Accordingly, the first wall portion of the bracket can be set to a position higher than the third wall portion, while securing length of the structural members in the vehicle up-down (vehicle-height) direction, and also maintaining the positions of the structural members and of the battery unit in the vehicle up-down direction.

Also, with regard to the structural members, the end portion of the first lower-wall portion at the inward side in the vehicle width direction and the end portion of the second lower-wall portion at the outward side in the vehicle width direction are connected along the vehicle up-down direction by the stepped portion, and the bulkhead is interposed between the side-wall portion on the outer side in the vehicle width direction of structural members and the stepped portion inside the structural members. This bulkhead is capable of supporting the second lower-wall portion when a load from the inward side in the vehicle width direction acts on the second lower-wall portion. Accordingly, when the inertia force toward the collision side acts on the battery unit in a broadside collision and a load acts on the bracket from the inward side in the vehicle width direction, the structural members and the bulkhead generate stable supporting reaction force. Thus, the battery unit can stably move while stably deforming the bracket.

In the above aspect, an under cover may be disposed below the battery case in the vehicle-height direction. A protecting member may be disposed adjacent to and outward of the battery case in the vehicle width direction, and be fastened along with the third wall portion of the bracket and the under cover.

According to the above configuration, the lower surface side of the battery case is protected by the under cover, and the outward side in the vehicle width direction of the battery case is protected by the protecting member. Now, the protecting member is disposed adjacent to the battery case at the outward side in the vehicle width direction, and is fastened along with the third wall portion of the bracket and the under cover. Also, the third wall portion of the bracket is fixed to the lower surface of the battery case, as described above.

Accordingly, even when a load from the outward side in the vehicle width direction acts on the protecting member when the battery unit moves due to the inertia force in a broadside collision and the bracket is deformed, the distance between the protecting member and the battery inside the battery case can be suppressed from becoming shorter. As a result, the load can be suppressed from being input from the protecting member to the battery via the battery case in a broadside collision.

In the above aspect, the vehicle base structure may be a vehicle base structure of a vehicle which includes a frame, in which a vehicle body having a cabin is supported on the frame. The first and second structural members may be side rails making up part of the frame.

According to the above configuration, the movement stroke of the battery unit in a broadside collision, in which collision load is input to a side rail in a vehicle with a frame, can be lengthened.

In the above aspect, the third wall portion may include an exposed portion at which no member is disposed. A length of the exposed portion may be set such that part of the battery case is allowed to be positioned below the first wall portion and the second wall portion when the third wall portion exhibits bending deformation under the load.

In the above aspect, the bulkhead may be configured to, be capable of supporting the second lower-wall portion when a load is applied to the second lower-wall portion from inward in the vehicle width direction.

In the above aspect, the vehicle base structure may include a plurality of the brackets, the plurality of the brackets including first and second brackets. The first wall portion of the first bracket may be fixed to the lower surface of the first structural member. The first wall portion of the second bracket may be fixed to the lower surface of the second structural member.

The above aspect of the disclosure yields excellent advantages in that the movement stroke of the battery unit in a broadside collision can be lengthened.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle base structure according to an embodiment of the disclosure will be described with reference to FIGS. 1 through 5. Note that in these drawings, an arrow FR that is shown where appropriate indicates a vehicle forward side, an arrow UP indicates a vehicle upward side, an arrow W indicates a vehicle width direction, and an arrow IN indicates an inward side in the vehicle width direction.

Configuration of Embodiment

Figure 1:
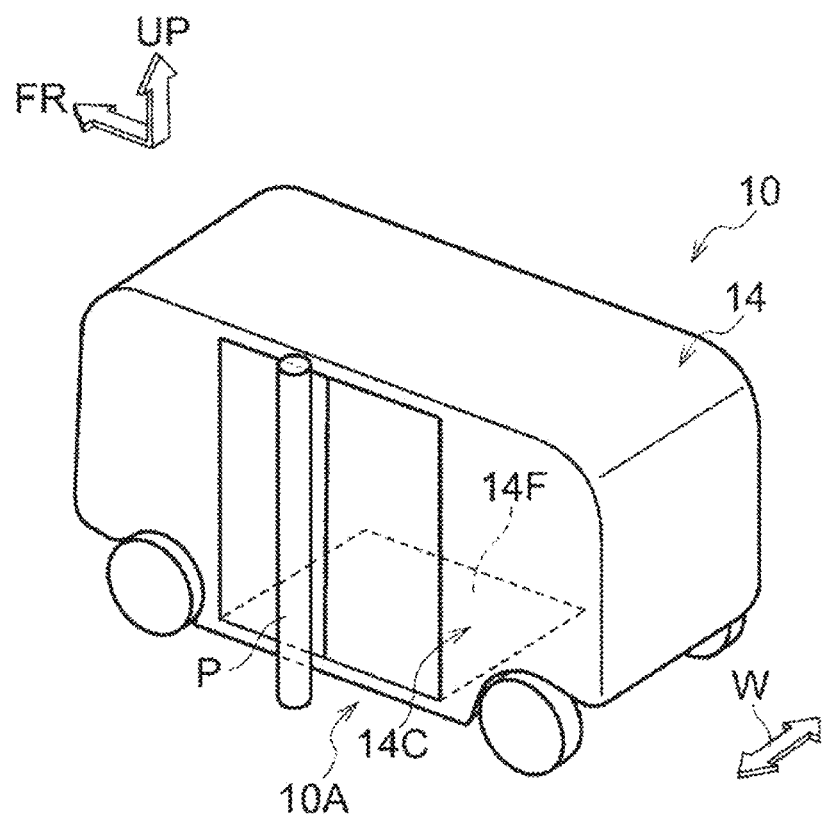
FIG. 1 is a perspective view schematically illustrating a vehicle, in which a vehicle base structure according to an embodiment of the disclosure is applied, in a state of collision with a pole.

FIG. 1 is a perspective view schematically illustrating a vehicle 10 to which a vehicle base structure according to an embodiment is applied, in a state of collision with a pole. As one example, the vehicle 10 according to the present embodiment is an electric vehicle that uses a motor, omitted from illustration, as a drive source. The vehicle 10 also is a vehicle with a frame, and a vehicle body 14 that has a cabin 14C is supported upon a frame 12 (see FIG. 2).

Figure 2:
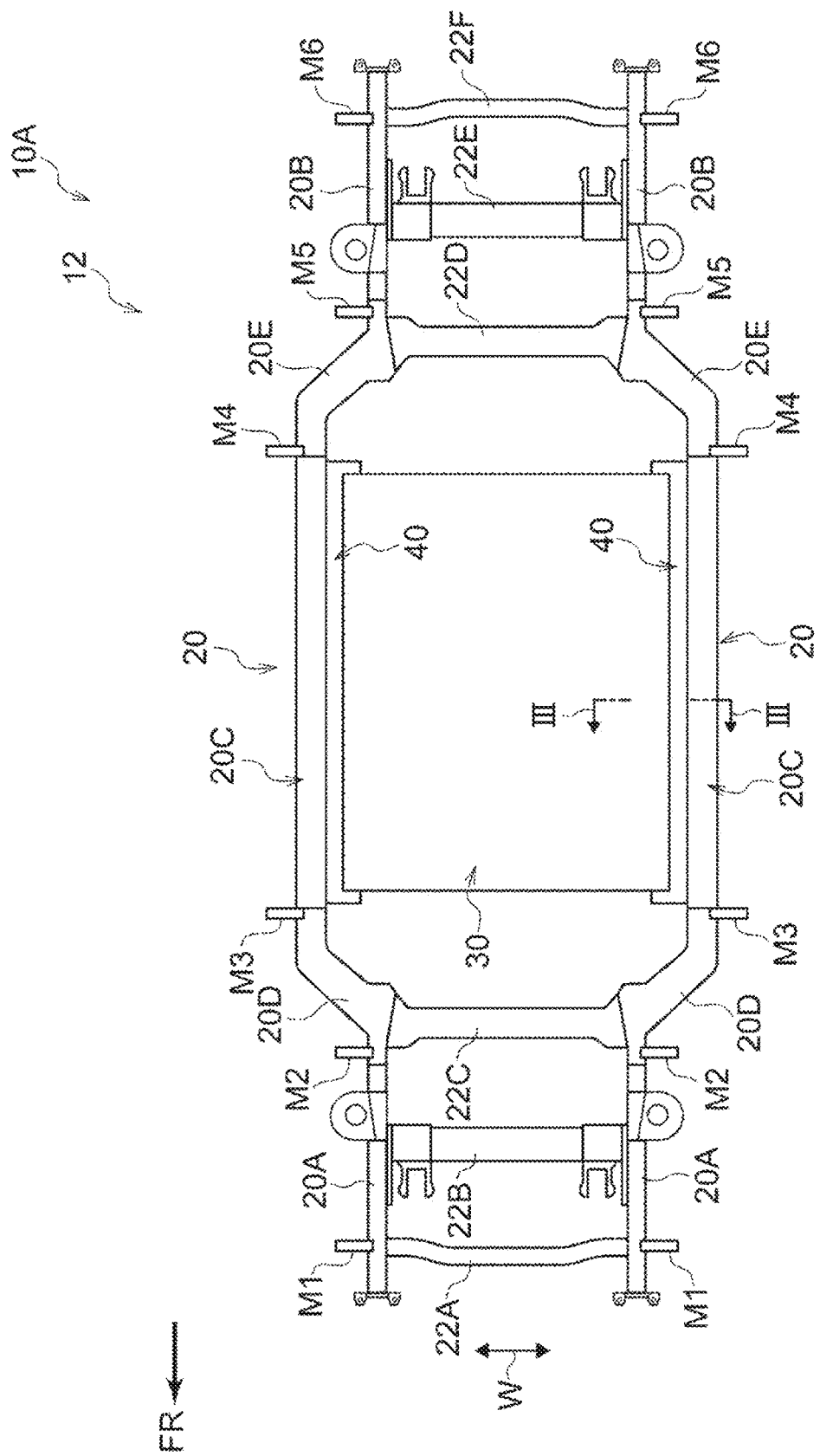
FIG. 2 is a plan view illustrating a part of a vehicle base including a frame of the vehicle in FIG. 1.

FIG. 2 is a plan view illustrating part of a vehicle base 10A including the frame 12. The frame 12 is provided with side rails 20 as a right-left pair of structural members (first and second structural members) extending along the vehicle front-rear direction, disposed at both sides (first and second sides) of the vehicle base 10A in the vehicle width direction, respectively. The side rails 20 have a closed cross-section structure that extends along the vehicle front-rear direction (see FIG. 3).

The side rails 20 each have a middle rail portion 20C that makes up the middle portion thereof in the vehicle front-rear direction and extends along the vehicle front-rear direction. Also, front-side rail portions 20A that make up a front side of the side rails and rear-side rail portions 20B that make up a rear side of the side rails 20 extend along the vehicle front-rear direction, and are set to be situated at inward of the middle rail portions 20C in the vehicle width direction and above the middle rail portions 20C in the vehicle up-down direction (vehicle-height direction). Front wheels, omitted from illustration, are disposed at the outward side in the vehicle width direction of the front-side rail portions 20A of the side rails 20, and rear wheels, omitted from illustration, are disposed on the outward side in the vehicle width direction of the rear-side rail portions 20B of the side rails 20. Also, the front-side rail portions 20A and middle rail portions 20C of the side rails 20 are linked by front-side linking rail portions 20D, and the rear-side rail portions 20B and the middle rail portions 20C of the side rails 20 are linked by rear-side linking rail portions 20E.

The side rails 20 have the front-side portions thereof linked to each other by a plurality of crossmembers 22A, 22B, and 22C extending along the vehicle width direction. The side rails 20 also have the rear-side portions thereof linked to each other by a plurality of crossmembers 22D, 22E, and 22F extending along the vehicle width direction. These crossmembers 22A, 22B, 22C, 22D, 22E, and 22F make up part of the frame 12.

A plurality of pairs of front-side mount portions M1, M2, and M3, for supporting the front-side portion of the vehicle body 14 (see FIG. 1), is provided at the front-side portions of the side rails 20. Also, a plurality of pairs of rear-side mount portions M4, M5, and M6, for supporting the rear-side portion of the vehicle body 14 (see FIG. 1), is provided at the rear-side portions of the side rails 20.

Figure 3:
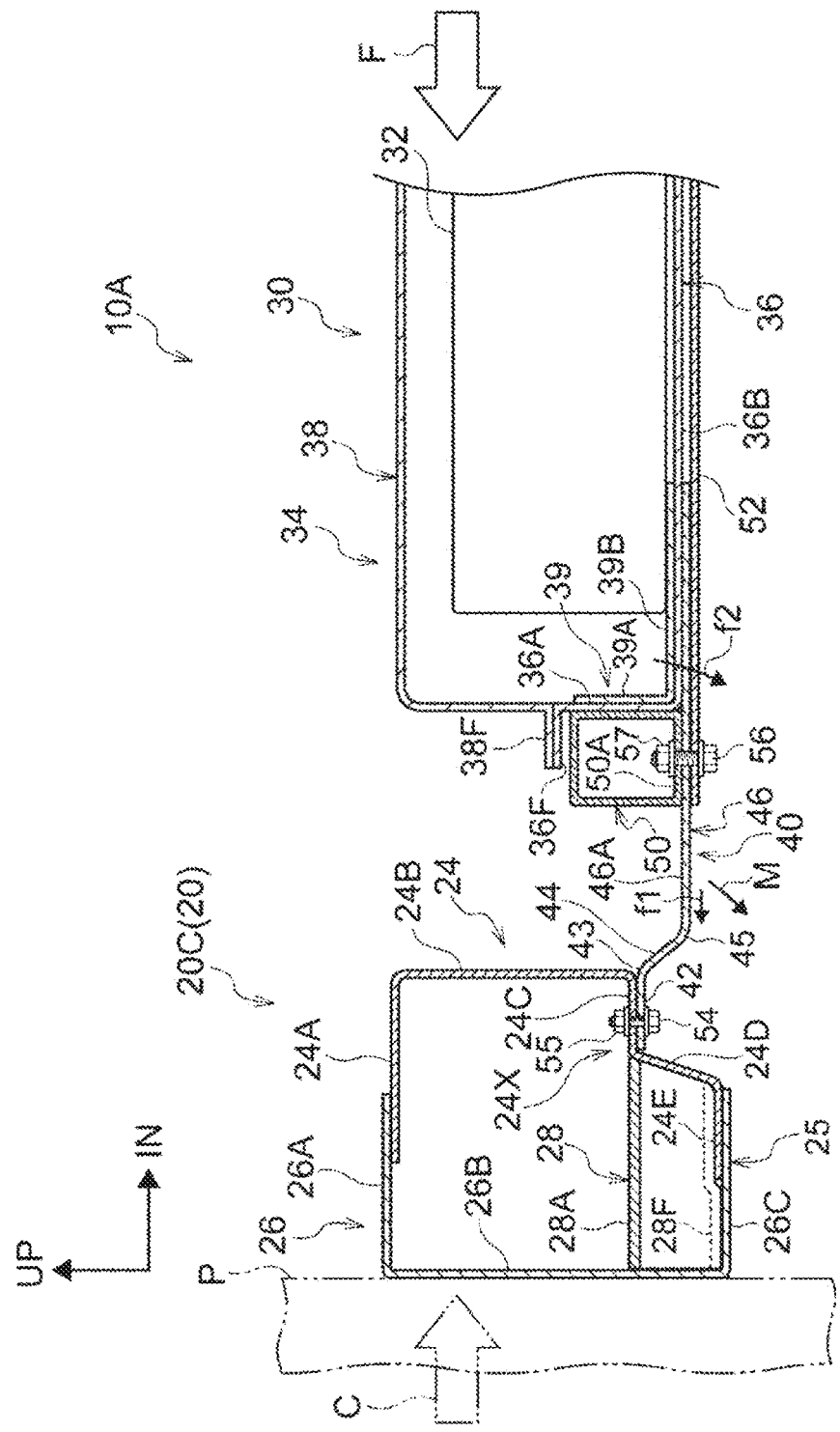
FIG. 3 is an enlarged vertical sectional view in which a cross-section taken along line III-III in FIG. 2 is enlarged.

FIG. 3 is an enlarged vertical sectional view in which a cross-section taken along line III-III in FIG. 2 is enlarged. The middle rail portion 20C of the side rail 20 is composed of an inner panel 24 and an outer panel 26 that are joined, as illustrated in FIG. 3.

The outer panel 26 makes up a portion of the middle rail portion 20C that is at the outward side in the vehicle width direction, and has an open cross-sectional form that is opened toward the inward side in the vehicle width direction, when a vertical section thereof is viewed in the vehicle front-rear direction. More specifically, the outer panel 26 is provided with an outer upper-wall portion 26A, an outer side-wall portion 26B that is bent from the end portion of the outer upper-wall portion 26A at the outward side in the vehicle width direction and extends toward the vehicle downward side, and an outer lower wall portion 26C that is bent and extends toward the inward side in the vehicle width direction from the lower end portion of the outer side-wall portion 26B.

The inner panel 24 makes up a portion of the middle rail portion 20C that is at the inward side in the vehicle width direction, and has an open cross-sectional form that is opened toward the outward side in the vehicle width direction, when a vertical section thereof is viewed in the vehicle front-rear direction. The inner panel 24 is configured to include an inner upper-wall portion 24A that is joined to the outer upper-wall portion 26A, and an inner first lower-wall portion 24E that is joined to the outer lower wall portion 26C.

A portion of the inner upper-wall portion 24A at the outward side in the vehicle width direction overlaps from below and is joined to a portion of the outer upper-wall portion 26A at the inward side in the vehicle width direction. The inner first lower-wall portion 24E overlaps from above and is joined to a portion of the outer lower wall portion 26C at the inward side in the vehicle width direction. Also, the end portion of the inner first lower-wall portion 24E at the inward side in the vehicle width direction generally matches the end portion of the outer lower wall portion 26C at the inward side in the vehicle width direction. Further, the end portion of the inner first lower-wall portion 24E at the inward side in the vehicle width direction is set to be situated at a position further to the outward side in the vehicle width direction than the end portion of the inner upper-wall portion 24A at the inward side in the vehicle width direction.

Also, the inner panel 24 is provided with an inner side-wall portion 24B that is bent toward the vehicle downward side from the end portion of the inner upper-wall portion 24A at the inward side in the vehicle width direction and extends downward, and a bent wall portion 24X that connects the lower end portion of the inner side-wall portion 24B and the end portion of the inner first lower-wall portion 24E at the inward side in the vehicle width direction. The position of the lower end of the inner side-wall portion 24B in the vehicle up-down direction is set to be a position that is higher than the position of the lower end of the outer side-wall portion 26B in the vehicle up-down direction. The bent wall portion 24X is provided with an inner second lower-wall portion 24C that is bent to extend to the outward side in the vehicle width direction from the lower end portion of the inner side-wall portion 24B and serves as a second lower-wall portion, and also is provided with a stepped portion 24D that connects the end portion of the inner first lower-wall portion 24E at the inward side in the vehicle width direction and the end portion of the inner second lower-wall portion 24C at the outward side in the vehicle width direction, along the vehicle up-down direction. The stepped portion 24D is somewhat inclined to the inward side in the vehicle width direction, toward the vehicle upward side.

A portion made up of the outer lower wall portion 26C and the inner first lower-wall portion 24E makes up a lower wall at the outward side in the vehicle width direction of the middle rail portion 20C, and will be referred to as a first lower-wall portion in the following description. The above-described inner second lower-wall portion 24C is set to a position that is inward of the first lower-wall portion 25 in the vehicle width direction and that is above first lower-wall portion 25 in the vehicle up-down direction.

Figure 4:
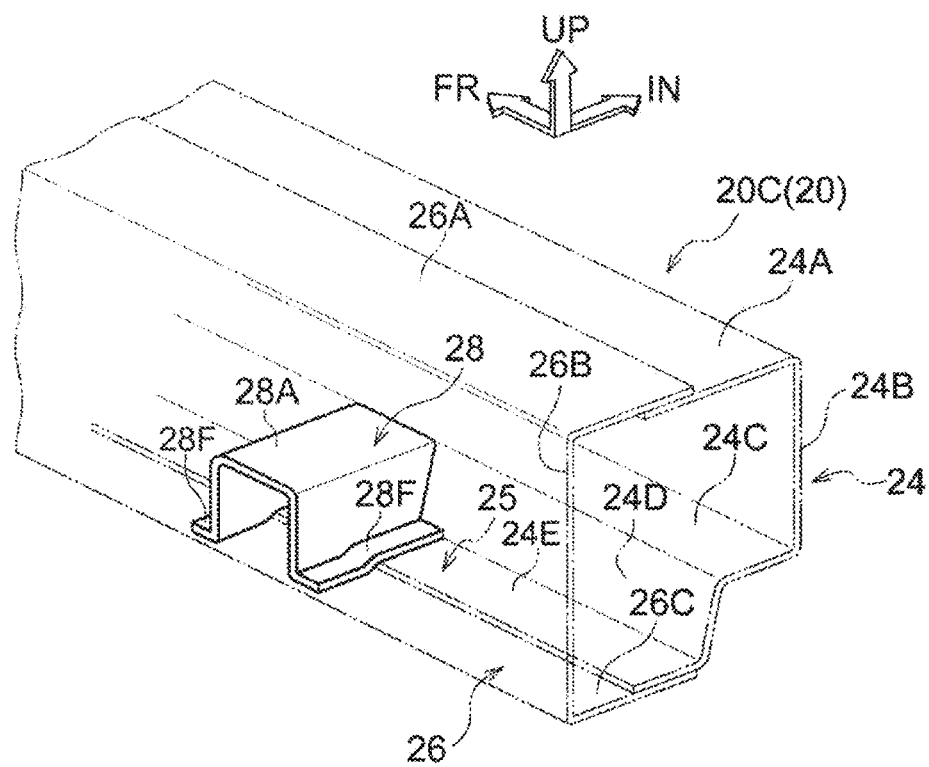
FIG. 4 is a perspective view illustrating a bulkhead in FIG. 3.

A bulkhead 28 that is interposed between the outer side-wall portion 26B that is the side wall portion of the middle rail portion 20C at the outward side in the vehicle width direction and the stepped portion 24D, is provided inside of the middle rail portion 20C of the side rail 20. The bulkhead 28 is made of a metal plate, for example. FIG. 4 illustrates the bulkhead 28 in a perspective view. Note that in FIG. 4, part of the middle rail portion 20C in a state with the bulkhead 28 provided thereto is indicated by imaginary lines (long dashed double-short dashed lines).

As illustrated in FIG. 4, the bulkhead 28 extends along the vehicle width direction, and the cross-sectional shape thereof orthogonal to the vehicle width direction is a general hat shape that opens downwards in the vehicle up-down direction. A pair of flange portions 28F that make up the lower end portion of the bulkhead 28 and that are arrayed in the vehicle front-rear direction are overlaid on the first lower-wall portion 25 and joined thereto by welding. In the present embodiment, the bulkhead 28 is provided at a middle portion in the vehicle front-rear direction inside the middle rail portion 20C as one example. Note that a plurality of bulkheads 28 may be provided within the middle rail portion 20C and arrayed in the vehicle front-rear direction. In this case, the bulkheads 28 preferably are provided at a plurality of parts including the middle portion in the vehicle front-rear direction inside the middle rail portion 20C.

An upper surface of an upper wall portion 28A of the bulkhead 28 is flush with an upper surface of the inner second lower-wall portion 24C of the middle rail portion 20C, as illustrated in FIG. 3. Also, the end face of the bulkhead 28 at the outward side in the vehicle width direction is disposed adjacent with (more specifically, in planar contact with) the outer side-wall portion 26B at the outward side in the vehicle width direction of the middle rail portion 20C. Further, the end face of the bulkhead 28 at the inward side in the vehicle width direction is somewhat inclined to the inward side in the vehicle width direction, toward the vehicle upward side, and is disposed adjacent with (more specifically, in planar contact with) the stepped portion 24D of the middle rail portion 20C. According to the above, the bulkhead 28 is capable of supporting the inner second lower-wall portion 24C when a load is applied to the inner second lower-wall portion 24C from the inward side in the vehicle width direction.

As illustrated in FIG. 2, a battery unit 30 (illustrated in a simplified form in FIG. 2) is disposed between the side rails 20. Note that a front portion of the battery unit 30 is attached to the crossmember 22C using an attachment member (omitted from illustration), and a rear portion of the battery unit 30 is attached to the crossmember 22D using an attachment member (omitted from illustration), although detailed illustration thereof is omitted.

As illustrated in FIG. 3, the battery unit 30 is a unit in which a battery 32 (illustrated in a simplified form in FIG. 3) is accommodated in a battery case 34. The battery 32 is for supplying electric power to a motor (omitted from illustration) that is the drive source of the vehicle 10 (see FIG. 1), and is also referred to as a fuel cell stack. The battery case 34 is made of a lower case 36 and an upper case 38 that are joined. A flange portion 36F extends outwards from an opening edge of the lower case 36 that is opened toward the upward side. Conversely, a flange portion 38F extends outwards from an opening edge of the upper case 38 that is opened toward the downward side. The upper case 38 is laid on the lower case 36 so as to be overlaid in planar view of the vehicle, and the flange portion 38F of the upper case 38 is overlaid on the flange portion 36F of the lower case 36 and joined. This battery case 34 is not joined to a floor panel 14F of the cabin 14C (see FIG. 1 for either).

Reinforcements 39, which are L-shaped as viewed in the vehicle front-rear direction, are disposed at corner portions of the lower case 36 on both sides in the vehicle width direction. Erect wall portions 39A of the reinforcements 39 are joined to erect wall portions 36A of the lower case 36 by spot welding or the like. Lower wall portions 39B of the reinforcements 39 are also joined to lower wall portions 36B of the lower case 36 by spot welding or the like. The length of the lower wall portions 39B as viewed in the vehicle front-rear direction is set to be longer than the length of the erect wall portions 39A.

The middle rail portions 20C and the battery unit 30 are linked by brackets 40. The brackets 40 are, in one example, metal members composed of slender plate members. The brackets 40 extend along the vehicle front-rear direction, as illustrated in a simplified form in FIG. 2. The length of the brackets 40 in the vehicle front-rear direction is set to generally correspond to the length of the battery unit 30 in the vehicle front-rear direction. The bracket 40 has a first wall portion 42 that is fixed to the lower surface of the inner second lower-wall portion 24C of the middle rail portion 20C by a bolt 54 and a nut 55, as illustrated in FIG. 3. The end position of the first wall portion 42 of the bracket 40 at the outward side in the vehicle width direction generally matches the end position of the inner second lower-wall portion 24C of the middle rail portion 20C at the outward side in the vehicle width direction. Also, the end position of the first wall portion 42 of the bracket 40 at the inward side in the vehicle width direction generally matches the end position of the inner second lower-wall portion 24C of the middle rail portion 20C at the inward side in the vehicle width direction.

The bracket 40 also is provided with a second wall portion 44 that extends inward in the vehicle width direction from an inner end portion of the first wall portion 42 such that the second wall portion 44 is inclined downward in a vehicle-height direction from the inner end portion of the first wall portion 42, and further is provided with a third wall portion 46 extending inward in the vehicle width direction from an inner end portion of the second wall portion 44 that is an end portion at an inward side of the second wall portion 44 in the vehicle width direction. The third wall portion 46 is fixed to the lower surface of the battery case 34 at that part at the inward side in the vehicle width direction, by spot welding or the like.

On the other hand, a protecting member 50 is disposed adjacent to (more specifically, in planar contact with) an outer peripheral side of the battery case 34 including the outward side in the vehicle width direction. The protecting member 50 is made of metal in one example, and is disposed along the perimeter of the battery case 34 at the downward side of the flange portions 36F and 38F of the battery case 34. The protecting member 50 has a rectangular closed cross-sectional structure that extends along the perimeter of the battery case 34, and is disposed on top of a middle portion of the third wall portion 46 of the bracket 40 in the vehicle width direction.

Also, an under cover 52 is disposed at the downward side of the battery case 34. The under cover 52 covers the battery case 34 from the downward side of the vehicle, and the perimeter portion of the under cover 52 is positioned at the downward side of the protecting member 50. The under cover 52 is laid on part of the third wall portion 46 of the bracket 40 from the lower surface side. A lower wall portion 50A of the above-described protecting member 50 is fastened by a bolt 56 and a nut 57 along with the third wall portion 46 of the bracket 40 and the under cover 52. The under cover 52 is made of metal in one example.

Figure 5:
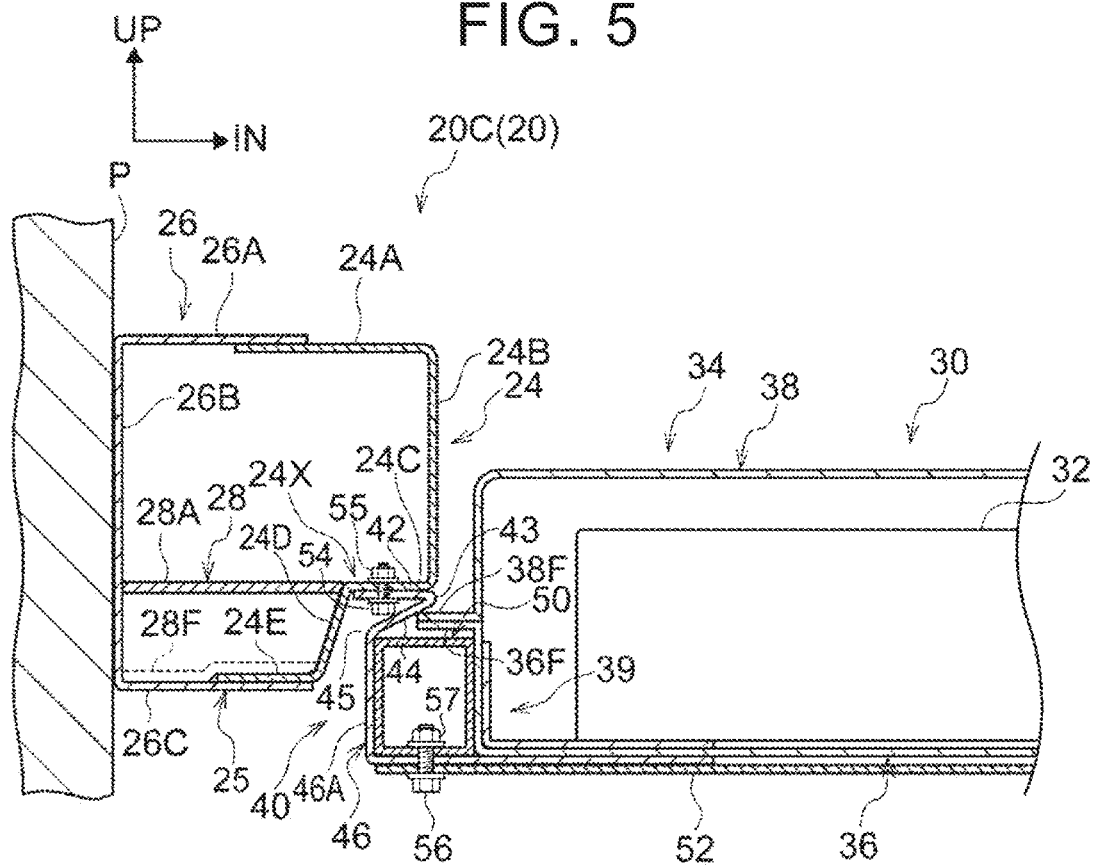
FIG. 5 is a vertical sectional view illustrating the same cross-section in FIG. 3 in a broadside collision state.

According to the above, the third wall portion 46 of the bracket 40 is provided with an exposed portion 46A at which no other members, including the battery unit 30, are disposed, over a predetermined range in the vehicle width direction from the end portion thereof at the outward side in the vehicle width direction. The bracket 40 is configured such that when a collision load C is input to the middle rail portion 20C from the outward side in the vehicle width direction and inertia force f1 to the outward side in the vehicle width direction acts on a connecting portion (in other words, a boundary portion) 45 of the second wall portion 44 and the third wall portion 46, moment M centered on a connecting portion (in other words, a boundary portion) 43 of the first wall portion 42 and the second wall portion 44 is generated, and a load f2 acts to cause the battery unit 30 to move from the installation position thereof toward the outward side in the vehicle width direction and also toward the vehicle downward side. The third wall portion 46 is configured to exhibit bending deformation at the end portion of the exposed portion 46A at the inward side in the vehicle width direction, under the load (see arrow f2) from the battery unit 30 side when this load f2 acts thereupon (see FIG. 5). The length of the exposed portion 46A in the vehicle width direction is set to be such a length that a deformation mode, in which the bracket 40 is deformed and the tip sides of the flange portions 36F and 38F of the battery case 34 come to be situated at the downward side of the first wall portion 42 and the second wall portion 44 in a broadside collision, as illustrated in FIG. 5, can be realized.

Effects and Advantages of Embodiment

Next, the effects and advantages of the present embodiment will be described.

In the present embodiment, when a pole P that is a colliding object collides with the middle rail portion 20C of the side rail 20 from the outward side in the vehicle width direction in a broadside collision, as illustrated in FIG. 3, inertia force F acts on the battery unit 30 toward the collision side. As the battery unit 30 is displaced toward the middle rail portion 20C on the collision side, the bracket 40 deforms with the connecting portion 43 of the first wall portion 42 and the second wall portion 44 and the connecting portion 45 of the second wall portion 44 and the third wall portion 46 as starting points.

At this time, inertia force f1 toward the outward side in the vehicle width direction acts upon the connecting portion 45 of the second wall portion 44 and the third wall portion 46, and moment M centered on the connecting portion 43 of the first wall portion 42 and the second wall portion 44 is generated. Now, the second wall portion 44 is inclined from the end portion at the inward side in the vehicle width direction of the first wall portion 42 to the inward side in the vehicle width direction, toward the vehicle downward side, and accordingly, when the moment M is generated, the load f2 acts on the battery unit 30, causing the battery unit 30 to be displaced from the installation position toward the outward side in the vehicle width direction and the vehicle downward side. Accordingly, the battery unit 30 is guided from the installation position toward the outward side in the vehicle width direction and the vehicle downward side. Thus, the movement stroke of the battery unit 30 in a broadside collision is longer as compared to when the battery unit moves horizontally toward the collision side in a broadside collision.

Also, in the present embodiment, when the load f2 that causes the battery unit 30 to move from the installation position toward the outward side in the vehicle width direction and the vehicle downward side acts on the battery unit 30, the third wall portion 46 of the bracket 40 exhibits bending deformation at the end of the exposed portion 46A at the inward side in the vehicle width direction under the load (see arrow f2) from the battery unit side (see FIG. 5). When the battery unit 30 moves to the position of the battery unit 30 illustrated in FIG. 5, for example, as the third wall portion 46 of the bracket 40 exhibits bending deformation, a pivoting radius around the connecting portion 43 of the first wall portion 42 and the second wall portion 44 serving as the center of pivoting can be made to be longer as compared with when there is no bending deformation of the third wall portion 46 (in other words, in comparison with when the length of the second wall portion 44 as viewed in the vehicle front-rear direction is the pivoting radius). As a result, the movement stroke of the battery unit 30 can be made to be longer. Note that bending deformation of the third wall portion 46 can also increase the amount of energy absorbed.

Also, in the present embodiment, the inner second lower-wall portion 24C of the middle rail portion 20C is set to a position on the inward side in the vehicle width direction and on the upward side in the vehicle up-down direction from the first lower-wall portion 25, and the first wall portion 42 of the bracket 40 is fixed to the lower surface thereof, as illustrated in FIG. 3. Accordingly, the first wall portion 42 of the bracket 40 can be set to a position higher than the third wall portion 46, while securing length of the middle rail portion 20C in the vehicle up-down direction and also maintaining the positions of the middle rail portion 20C and of the battery unit 30 in the vehicle up-down direction.

Also, in the present embodiment, with regard to the middle rail portion 20C, the first lower-wall portion 25 and the inner second lower-wall portion 24C are connected by the stepped portion 24D, and the bulkhead 28 is interposed between the outer side-wall portion 26B of the middle rail portion 20C and the stepped portion 24D inside the middle rail portion 20C. The bulkhead 28 is capable of supporting the inner second lower-wall portion 24C when a load from the inward side in the vehicle width direction acts on the inner second lower-wall portion 24C. Accordingly, when the inertia force F toward the collision side acts on the battery unit 30 in a broadside collision and a load acts on the bracket 40 from the inward side in the vehicle width direction, the middle rail portion 20C and the bulkhead 28 generate stable supporting reaction force. Thus, the battery unit 30 can stably move while stably deforming the bracket 40 (see FIG. 5).

As described above, according to the vehicle base structure of the present embodiment, the movement stroke of the battery unit 30 in a broadside collision can be lengthened.

Also, in the present embodiment, the lower surface side of the battery case 34 is protected by the under cover 52, and the outward side in the vehicle width direction of the battery case 34 is protected by the protecting member 50. Now, the protecting member 50 is disposed adjacent to the battery case 34 at the outward side in the vehicle width direction, and is fastened along with the third wall portion 46 of the bracket 40 and the under cover 52. Also, the third wall portion 46 of the bracket 40 is fixed to the lower surface of the battery case 34, as described above. Accordingly, even when a load from the outward side in the vehicle width direction acts on the protecting member 50 illustrated in FIG. 5 and the battery unit 30 moves due to the inertia force F in a broadside collision and the bracket 40 is deformed, the distance between the protecting member 50 and the battery 32 inside the battery case 34 can be suppressed from becoming shorter. As a result, a load can be suppressed from being input from the protecting member 50 to the battery 32 via the battery case 34 (more specifically, the erect wall portion 36A of the lower case 36) in a broadside collision.

Supplementary Description of Embodiment

Note that in the present embodiment, the first lower-wall portion 25, the inner second lower-wall portion 24C, and the stepped portion 24D are provide on the middle rail portion 20C, as illustrated in FIG. 3 and other drawings. However, a configuration may be made in which the lower wall portion of the structural member is not stepped, but instead has a flat shape. For example, a middle rail portion (portion constituting the middle portion of the structural member in the vehicle front-rear direction) provided with a lower-wall portion set to a position of the inner second lower-wall portion 24C in the vehicle up-down direction, illustrated in FIG. 3, may be applied instead of the middle rail portion 20C of the above embodiment. In this case, a reinforcing member for reinforcing the lower-wall portions may be provided.

Also, in the present embodiment, the bracket 40 is fixed to the lower surface of the battery case 34 at a part of the third wall portion 46 at the inward side in the vehicle width direction, which is a preferable configuration, but a configuration may be made in which the bracket 40 is fixed to the lower surface of the battery case 34 at a part including a part of the third wall portion 46 at the outward side in the vehicle width direction.

Also, in the present embodiment, the protecting member 50 is fastened along with the third wall portion 46 of the bracket 40 and the under cover 52, but a configuration may be made in which the protecting member is fastened by bolting to the third wall portion 46 of the bracket 40 alone. Further, a configuration may be made in which the protecting member 50 is not provided.

Also, in the present embodiment, the vehicle 10 is described as a vehicle with a frame, but the vehicle base structure according to the disclosure may be applied to a vehicle with a frameless structure (monocoque structure). Also, in the present embodiment, the structural members are the side rails 20, but the structural members may be rocker panels (also referred to as side sills) of a frameless-structure vehicle.

Note that the above embodiment and the above modifications may be combined and carried out as appropriate.

Although an example of the disclosure has been described above, the disclosure is not limited to the above, and it is needless to say that the disclosure may be carried out by arrangements other than the above, modified variously, without departing from the scope thereof.

What is claimed is:

1. A vehicle base structure, comprising:
    first and second structural members extending along a vehicle front-rear direction, the first and second structural members being disposed respectively at first and second sides of a vehicle base in a vehicle width direction;
    a battery unit disposed between the first and second structural members, the battery unit including a battery case and a battery accommodated in the battery case;
    a bracket including
        a first wall portion fixed to a lower surface of one of the first and second structural members,
        a second wall portion extending inward in the vehicle width direction from an inner end portion of the first wall portion such that the second wall portion is inclined downward in a vehicle-height direction from the inner end portion of the first wall portion, the inner end portion of the first wall portion being an end portion at an inward side of the first wall portion in the vehicle width direction, and
        a third wall portion extending inward in the vehicle width direction from an inner end portion of the second wall portion, the third wall portion being fixed to a lower surface of the battery case, and the inner end portion of the second wall portion being an end portion at an inward side of the second wall portion in the vehicle width direction; and
    a floor panel overlapping the battery unit in the vehicle-height direction, wherein
    the battery case is not joined to the floor panel, and
    the third wall portion includes an exposed portion at which no member, including the battery unit, is disposed, over a predetermined range in the vehicle width direction from an end portion at an outward side of the third wall portion in the vehicle width direction.

2. The vehicle base structure according to claim 1, wherein:
    the bracket is fixed to the lower surface of the battery case, at an inner part of the third wall portion, the inner part being at an inward side of the third wall portion in the vehicle width direction; and
    the third wall portion is configured to, when a load acts to move the battery unit from an installation position of the battery unit outward in the vehicle width direction and downward in the vehicle-height direction, exhibit bending deformation under the load.

3. The vehicle base structure according to claim 2, wherein:
    a length of the exposed portion is set such that part of the battery case is allowed to be positioned below the first wall portion and the second wall portion when the third wall portion exhibits bending deformation under the load.

4. The vehicle base structure according to claim 2, wherein
    a time when the load acts to move the battery unit, is a time when a collision load is input to the first and second structural members from outward in the vehicle width direction and inertia force to outward in the vehicle width direction acts on a connecting portion of the second wall portion and the third wall portion so that moment centered on a connecting portion of the first wall portion and the second wall portion is generated and the load acts to move the battery unit.

5. The vehicle base structure according to claim 1, wherein:
    the first and second structural members each have a closed cross-section structure that extends along the vehicle front-rear direction;
    the first and second structural members each include
        a first lower-wall portion that makes up a lower wall of a corresponding one of the first and second structural members, the lower wall being at an outward side of the corresponding one of the first and second structural members in the vehicle width direction,
        a second lower-wall portion disposed at a position that is inward of the first lower-wall portion in the vehicle width direction and that is above the first lower-wall portion in the vehicle-height direction, the second lower-wall portion having a lower surface to which the first wall portion is fixed, and
        a stepped portion that connects an inner end portion of the first lower-wall portion and an outer end portion of the second lower-wall portion to each other along the vehicle-height direction, the inner end portion of the first lower-wall portion being at an inward side of the first lower-wall portion in the vehicle width direction, and the outer end portion of the second lower-wall portion being at an outward side of the second lower-wall portion in the vehicle width direction; and inside each of the first and second structural members, a bulkhead is provided, the bulkhead being interposed between the stepped portion and a side-wall portion of a corresponding one of the first and second structural members, the side-wall portion being at the outward side of the corresponding one of the first and second structural members in the vehicle width direction.

6. The vehicle base structure according to claim 5, wherein
the bulkhead is configured to, be capable of supporting the second lower-wall portion when a load is applied to the second lower-wall portion from inward in the vehicle width direction.

7. The vehicle base structure according to claim 1, wherein:
an under cover is disposed below the battery case in the vehicle-height direction; and
a protecting member is disposed adjacent to and outward of the battery case in the vehicle width direction, and is fastened along with the third wall portion of the bracket and the under cover.

8. The vehicle base structure according to claim 1, wherein:
the vehicle base structure is a vehicle base structure of a vehicle which includes a frame and in which a vehicle body having a cabin is supported on the frame; and
the first and second structural members are side rails making up part of the frame.

9. The vehicle base structure according to claim 1, wherein
the vehicle base structure includes a plurality of the brackets, the plurality of the brackets including first and second brackets,
the first wall portion of the first bracket is fixed to the lower surface of the first structural member, and
the first wall portion of the second bracket is fixed to the lower surface of the second structural member.

10. The vehicle base structure according to claim 1, wherein
in response to a collision load applied to the first and second structural members from an outer side of a vehicle toward an inner side of the vehicle in the vehicle width direction,
(i) the third wall portion is configured to exhibit bending deformation, and
(ii) the battery unit is configured to move toward the first wall portion.

11. The vehicle base structure according to claim 1, wherein
in response to a collision load applied to the first and second structural members from an outer side of a vehicle toward an inner side of the vehicle in the vehicle width direction,
(i) the third wall portion is configured to exhibit bending deformation, and
(ii) the second wall portion is configured to overlap the first wall portion in the vehicle-height direction.

12. The vehicle base structure according to claim 1, wherein
in response to a collision load applied to the first and second structural members from an outer side of a vehicle toward an inner side of the vehicle in the vehicle width direction,
(i) the third wall portion is configured to exhibit bending deformation, and
(ii) the third wall portion is configured to overlap the first wall portion in the vehicle-height direction.

13. The vehicle base structure according to claim 1, wherein
in response to a collision load applied to the first and second structural members from an outer side of a vehicle toward an inner side of the vehicle in the vehicle width direction,
(i) the third wall portion is configured to exhibit bending deformation,
(ii) the second wall portion is configured to overlap the first wall portion in the vehicle-height direction, and
(iii) the battery unit is configured to move toward the first wall portion.

14. The vehicle base structure according to claim 1, wherein
in response to a collision load applied to the first and second structural members from an outer side of a vehicle toward an inner side of the vehicle in the vehicle width direction,
(i) the third wall portion is configured to exhibit bending deformation,
(ii) the second wall portion and the third wall portion are configured to overlap the first wall portion in the vehicle-height direction, and
(iii) the battery unit is configured to move toward the first wall portion.

15. The vehicle base structure according to claim 1, further comprising:
a protecting member disposed adjacent to and outward of the battery case in the vehicle width direction and fastened to the third wall portion, wherein
in response to a collision load applied to the first and second structural members from an outer side of a vehicle toward an inner side of the vehicle in the vehicle width direction,
(i) the third wall portion is configured to exhibit bending deformation, and
(ii) the protecting member is configured to overlap the first wall portion in the vehicle-height direction.

16. The vehicle base structure according to claim 1, further comprising:
an under cover below the battery case in the vehicle-height direction; and
a protecting member disposed adjacent to and outward of the battery case in the vehicle width direction, and fastened to the third wall portion of the bracket and the under cover, wherein
in response to a collision load applied to the first and second structural members from an outer side of a vehicle toward an inner side of the vehicle in the vehicle width direction,
(i) the third wall portion is configured to exhibit bending deformation, and
(ii) the under cover and the protecting member are configured to overlap the first wall portion in the vehicle-height direction.

17. The vehicle base structure according to claim 1, wherein
the battery case comprises a flange portion extending outwardly in the vehicle width direction, and in response to a collision load applied to the first and second structural members from an outer side of a vehicle toward an inner side of the vehicle in the vehicle width direction,
(i) the third wall portion is configured to exhibit bending deformation, and
(ii) the flange portion is configured to overlap the first wall portion in the vehicle-height direction.

18. The vehicle base structure according to claim 17, further comprising:
a protecting member disposed adjacent to and outward of the battery case in the vehicle width direction and fastened to the third wall portion of the bracket, wherein
the protecting member is disposed below the flange portion in the vehicle-height direction, and
in response to the collision load applied to the first and second structural members, the flange portion and the protecting member are configured to overlap the first wall portion in the vehicle-height direction.

19. A vehicle base structure, comprising:
first and second structural members extending along a vehicle front-rear direction, the first and second structural members being disposed respectively at first and second sides of a vehicle base in a vehicle width direction;
a battery unit disposed between the first and second structural members, the battery unit including a battery case and a battery accommodated in the battery case; and
a bracket including
a first wall portion fixed to a lower surface of one of the first and second structural members,
a second wall portion extending inward in the vehicle width direction from an inner end portion of the first wall portion such that the second wall portion is inclined downward in a vehicle-height direction from the inner end portion of the first wall portion, the inner end portion of the first wall portion being an end portion at an inward side of the first wall portion in the vehicle width direction, and
a third wall portion extending inward in the vehicle width direction from an inner end portion of the second wall portion, the third wall portion being fixed to a lower surface of the battery case, and the inner end portion of the second wall portion being an end portion at an inward side of the second wall portion in the vehicle width direction, wherein
in response to a collision load applied to the first and second structural members from an outer side of a vehicle toward an inner side of the vehicle in the vehicle width direction,
(i) the third wall portion is configured to exhibit bending deformation, and
(ii) the battery unit is configured to move toward the first wall portion, and
the third wall portion includes an exposed portion at which no member, including the battery unit, is disposed, over a predetermined range in the vehicle width direction from an end portion at an outward side of the third wall portion in the vehicle width direction.

20. A vehicle base structure, comprising:
first and second structural members extending along a vehicle front-rear direction, the first and second structural members being disposed respectively at first and second sides of a vehicle base in a vehicle width direction;
a battery unit disposed between the first and second structural members, the battery unit including a battery case and a battery accommodated in the battery case; and
a bracket including
a first wall portion fixed to a lower surface of one of the first and second structural members,
a second wall portion extending inward in the vehicle width direction from an inner end portion of the first wall portion such that the second wall portion is inclined downward in a vehicle-height direction from the inner end portion of the first wall portion, the inner end portion of the first wall portion being an end portion at an inward side of the first wall portion in the vehicle width direction, and
a third wall portion extending inward in the vehicle width direction from an inner end portion of the second wall portion, the third wall portion being fixed to a lower surface of the battery case, and the inner end portion of the second wall portion being an end portion at an inward side of the second wall portion in the vehicle width direction, wherein
in response to a collision load applied to the first and second structural members from an outer side of a vehicle toward an inner side of the vehicle in the vehicle width direction,
(i) the third wall portion is configured to exhibit bending deformation, and
(ii) the second wall portion is configured to overlap the first wall portion in the vehicle-height direction, and
the third wall portion includes an exposed portion at which no member, including the battery unit, is disposed, over a predetermined range in the vehicle width direction from an end portion at an outward side of the third wall portion in the vehicle width direction.

* * * * *